United States Patent
Kan

(10) Patent No.: US 11,366,618 B2
(45) Date of Patent: Jun. 21, 2022

(54) ALL FLASH ARRAY SERVER AND CONTROL METHOD THEREOF

(71) Applicant: Silicon Motion, Inc., Hsinchu County (TW)

(72) Inventor: Li-Sheng Kan, Hsinchu County (TW)

(73) Assignee: Silicon Motion, Inc., Hsinchu County (TW)

(*) Notice: Subject to any disclaimer, the term of this patent is extended or adjusted under 35 U.S.C. 154(b) by 0 days.

(21) Appl. No.: 17/151,677

(22) Filed: Jan. 19, 2021

(65) Prior Publication Data
US 2021/0271419 A1    Sep. 2, 2021

Related U.S. Application Data

(60) Provisional application No. 62/983,754, filed on Mar. 2, 2020.

(51) Int. Cl.
*G06F 3/06* (2006.01)

(52) U.S. Cl.
CPC .......... *G06F 3/0659* (2013.01); *G06F 3/0604* (2013.01); *G06F 3/067* (2013.01); *G06F 3/0619* (2013.01); *G06F 3/0656* (2013.01); *G06F 3/0688* (2013.01)

(58) Field of Classification Search
CPC .... G06F 3/0659; G06F 3/0604; G06F 3/0619; G06F 3/0656; G06F 3/067; G06F 3/0688
See application file for complete search history.

(56) References Cited

U.S. PATENT DOCUMENTS

| | | | |
|---|---|---|---|
| 2016/0203080 A1* | 7/2016 | Bert | G06F 3/065 711/114 |
| 2017/0046268 A1* | 2/2017 | Ummadi | G06F 12/0875 |
| 2019/0171566 A1* | 6/2019 | Jung | G06F 12/10 |
| 2020/0097422 A1* | 3/2020 | Benisty | G06F 13/1668 |
| 2022/0050756 A1* | 2/2022 | Narasimhamurthy | G06F 11/2092 |

FOREIGN PATENT DOCUMENTS

| | | |
|---|---|---|
| CN | 102812518 A | 12/2012 |
| CN | 108268278 A | 7/2018 |
| TW | 201939491 A | 10/2019 |
| TW | I704568 B | 9/2020 |

* cited by examiner

*Primary Examiner* — Edward J Dudek, Jr.
(74) *Attorney, Agent, or Firm* — Winston Hsu

(57) ABSTRACT

The present invention provides a control method of a server, wherein the control method includes the steps of: setting a first node within the server as a master device; setting a second node within the server as a slave device; controlling the first node to receive data from another device via network; storing the data into a first write buffer within the first node; performing a cache mirroring operation to copy the data stored in the first write buffer into a second write buffer within the second node; setting a first tail register and a first head register within the first node, and setting a second tail register and a second head register within the second node; and referring to the first tail register and the first head register to determine if the data stored in the first write buffer is successful written into the second write buffer.

13 Claims, 7 Drawing Sheets

ALL FLASH ARRAY SERVER AND CONTROL METHOD THEREOF

CROSS REFERENCE TO RELATED APPLICATIONS

This application claims the priority of U.S. Provisional Application No. 62/983,754, filed on Mar. 2, 2020, which is included herein by reference in its entirety.

BACKGROUND OF THE INVENTION

1. Field of the Invention

The present invention is related to memory control, and more particularly, to a method for performing data access management of an all flash array (AFA) server, and associated apparatus such as the AFA server, a control circuit thereof, etc.

2. Description of the Prior Art

A data storage server may be arranged to store user data of one or more users, and various control methods regarding the data storage server have been proposed in the related art in order to bring good user experience to the users. As non-volatile (NV) memories such as Flash memories have been widely applied to various data storage device such as solid state drives (SSDs), etc., it is proposed in the related art to implement the data storage server to be a non-volatile (NV) memory type data storage server using NV memories as storage media thereof, such as an AFA server having multiple SSDs installed therein. However, some problems may occur. For example, the management of accessing the Flash memory in any SSD of the multiple SSDs is complicated. To ensure that the access control of the Flash memory in this SSD conforms to associated specifications, the controller of the Flash memory in this SSD is usually equipped with some management mechanisms to properly manage the internal operations thereof. Although SSD manufactures may have tried to make SSDs seem to be a good solution for replacing hard disk drives (HDDs), some characteristics of the SSDs are quite different from that of the HDDs. As a result, the control methods mentioned above may become improper or invalid, causing the overall performance of the AFA server to be degraded. Thus, a novel method and associated architecture are needed for solving the problems without introducing any side effect or in a way that is less likely to introduce a side effect.

SUMMARY OF THE INVENTION

It is therefore an objective of the present invention to provide a control method of a server, to solve the above-mentioned problems.

According to one embodiment of the present invention, a server comprising a SSD, a first node and a second node is disclosed. The first node comprises a first memory, a first processor and a first communication circuit, wherein the first memory comprises a first write buffer, at least a first tail register and at least a first head register, the first processor is configured to control operations of the first node. The second node comprises a second memory, a second processor and a second communication circuit, wherein the second memory comprises a second write buffer, at least a second tail register and at least a second head register, the second processor is configured to control operations of the first node, and the second communication circuit is coupled to the second processor, the second memory and the first communication circuit. The first tail register records data writing information of the first write buffer, the second tail register is synchronized by the first tail register, the second head register records data writing information of the second write buffer, and the first head register is synchronized by the second head register. In addition, when the first processor of the first node receives data from another electronic device, the first processor sends the data to the second node to store the data into the first write buffer, and the first processor further sends the data to the second node; and the first processor refers to the first tail register and the first head register to determine if the data is successful written into the second node.

According to one embodiment of the present invention, a control method of a server comprises the steps of: setting a first node within the server as a master device; setting a second node within the server as a slave device; controlling the first node to receive data from another device via network; storing the data into a first write buffer within the first node; performing a cache mirroring operation to copy the data stored in the first write buffer into a second write buffer within the second node; setting a first tail register and a first head register within the first node, and setting a second tail register and a second head register within the second node, wherein the first tail register records data writing information of the first write buffer, the second tail register is synchronized by the first tail register, the second head register records data writing information of the second write buffer, and the first head register is synchronized by the second head register; and referring to the first tail register and the first head register, by using a first processor within the first node, to determine if the data stored in the first write buffer is successful written into the second write buffer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
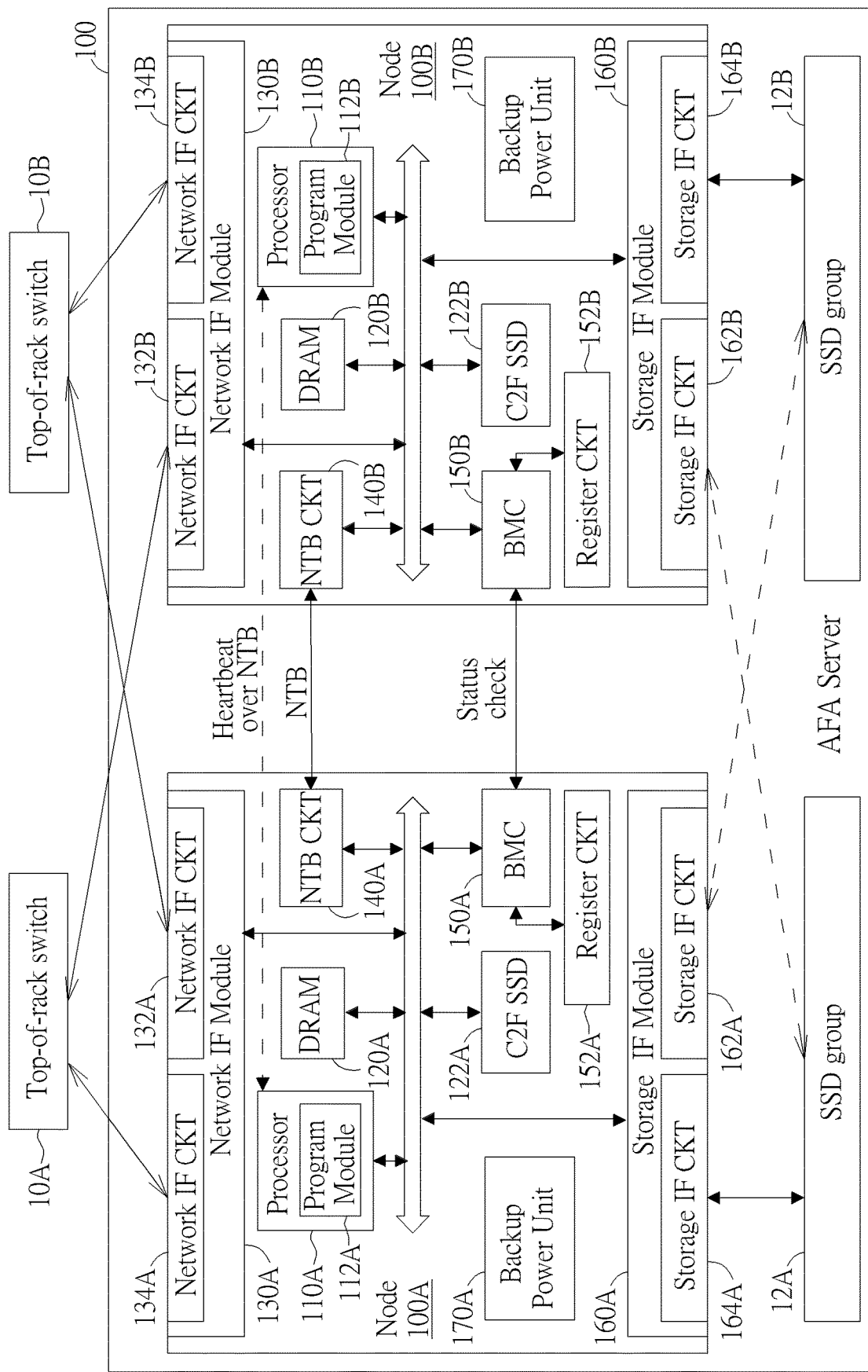
FIG. 1 is a diagram of an all flash array (AFA) server according to an embodiment of the present invention.

FIG. 1 is a diagram of an all flash array (AFA) server 100 according to an embodiment of the present invention. The AFA server 100 may comprise multiple nodes such as two nodes 100A and 100B, where any of the multiple nodes (e.g. one of the nodes 100A and 100B) may have the same or similar architecture as that of another of the multiple nodes (e.g. another of the nodes 100A and 100B). For example, the node 100A may comprise at least one processor (e.g. one or more processors such as one or more Central Processing Units (CPUs)) that may be collectively referred to as the processor 110A, and comprise a Dynamic Random Access Memory (DRAM) 120A, a Copy-to-Flash (C2F) SSD 122A, a network interface (IF) module 130A comprising one or more network interface circuits such as network interface circuits 132A and 134A (respectively labeled "Network IF CKT" for brevity), a Non-Transparent Bridge (NTB) module (or NTB) such as a NTB communications circuit 140A (labeled "NTB CKT" for brevity), a Board Management Controller (BMC) 150A, a register circuit 152A (labeled "Register CKT" for brevity) that is coupled to the BMC 150A, a storage interface (IF) module 160A comprising one or more storage interface circuits such as storage interface circuits 162A and 164A (respectively labeled "Storage IF CKT" for brevity), and a backup power source such as a backup power unit 170A (e.g. a battery), where at least one portion (e.g. a portion or all) of these components may be coupled to each other through a bus of the node 100A, but the present invention is not limited thereto. According to some embodiments, the architecture of the node 100A may vary.

Similarly, the node 100B may comprise at least one processor (e.g. one or more processors such as one or more CPUs) that may be collectively referred to as the processor 110B, and comprise a DRAM 120B, a C2F SSD 122B, a network interface (IF) module 130B comprising one or more network interface circuits such as network interface circuits 132B and 134B (respectively labeled "Network IF CKT" for brevity), a NTB module (or NTB) such as a NTB communications circuit 140B (labeled "NTB CKT" for brevity), a BMC 150B, a register circuit 152B (labeled "Register CKT" for brevity) that is coupled to the BMC 150B, a storage interface (IF) module 160B comprising one or more storage interface circuits such as storage interface circuits 162B and 164B (respectively labeled "Storage IF CKT" for brevity), and a backup power source such as a backup power unit 170B (e.g. a battery), where at least one portion (e.g. a portion or all) of these components may be coupled to each other through a bus of the node 100B, but the present invention is not limited thereto. According to some embodiments, the architecture of the node 100B may vary.

As shown in FIG. 1, the AFA server 100 may further comprise multiple SSDs coupled to the nodes 100A and 100B, such as the SSD groups 12A and 12B. The SSD groups 12A and 12B may be coupled to the nodes 100A and 100B, and may be respectively linked to the nodes 100A and 100B by default, where the dashed lines between the nodes 100A and 100B and the SSD groups 12B and 12A may indicate optional links. For example, the node 100A may utilize the storage interface module 160A to activate the link between the storage interface circuits 164A and the SSD group 12A, for accessing data in the SSD group 12A, and the node 100B may utilize the storage interface module 160B to activate the link between the storage interface circuits 164B and the SSD group 12B, for accessing data in the SSD group 12B. When there is a need, the linking relationships between the nodes 100A and 100B and the SSD groups 12A and 12B may vary. For example, the node 100A may utilize the storage interface module 160A to activate the link between the storage interface circuits 162A and the SSD group 12B, for accessing data in the SSD group 12B, and the node 100B may utilize the storage interface module 160B to activate the link between the storage interface circuits 162B and the SSD group 12A, for accessing data in the SSD group 12A.

The processor 110A running program modules 112A can be configured to control operations of the node 100A. The DRAM 120A can be configured to buffer data (e.g. data to be written into the SSD group 12A), and the C2F SSD 122A can be configured to copy buffered data in the DRAM 120A to a Flash memory within the C2F SSD 122A, to prevent data loss of the buffered data when there is a need. For example, the C2F SSD 122A can be implemented by way of an expansion card mounted on a main circuit board (e.g. main board or motherboard) within the node 100A, such as an M.2 module (e.g. a circuit board having a connector conforming to M.2 specification), where the C2F SSD 122A may comprise a memory controller, one or more Flash memory chips, etc., but the present invention is not limited thereto. In addition, the network interface module 130A comprising the network interface circuits 132A and 134A can be configured to couple the node 100A (e.g. the processor 110A, the DRAM 120A, etc. on the main circuit board therein) to at least one network (e.g. Local Area Network (LAN), Wide Area Network (WAN), Internet, etc.) through at least one network switch such as top-of-rack (TOR) switches 10A and 10B. Additionally, the storage interface module 160A comprising the storage interface circuits 162A and 164A can be configured to couple the node 100A (e.g. the processor 110A, the DRAM 120A, etc. on the main circuit board therein) to multiple Flash storage devices such as the SSD groups 12A and 12B shared by the nodes 100A and 100B, for accessing (e.g. reading or writing) data in the multiple Flash storage devices. As a result, the AFA server 100 can be configured to provide a storage service to users through the node 100A.

Similarly, the processor 110B running program modules 112B can be configured to control operations of the node 100B. The DRAM 120B can be configured to buffer data (e.g. data to be written into the SSD group 12B), and the C2F SSD 122B can be configured to copy buffered data in the DRAM 120B to a Flash memory within the C2F SSD 122B, to prevent data loss of the buffered data when there is a need. For example, the C2F SSD 122B can be implemented by way of an expansion card mounted on a main circuit board (e.g. main board or motherboard) within the node 100B, such as an M.2 module (e.g. a circuit board having a connector conforming to M.2 specification), where the C2F SSD 122B may comprise a memory controller, one or more Flash memory chips, etc., but the present invention is not limited thereto. In addition, the network interface module 130B comprising the network interface circuits 132B and 134B can be configured to couple the node 100B (e.g. the processor 110B, the DRAM 120B, etc. on the main circuit board therein) to at least one network (e.g. LAN, WAN, Internet, etc.) through at least one network switch such as the top-of-rack (TOR) switches 10A and 10B. Additionally, the storage interface module 160B comprising the storage interface circuits 162B and 164B can be configured to couple the node 100B (e.g. the processor 110B, the DRAM 120B, etc. on the main circuit board therein) to multiple Flash storage devices such as the SSD groups 12A and 12B shared by the nodes 100A and 100B, for accessing (e.g. reading or writing) data in the multiple Flash storage devices. As a result, the AFA server 100 can be configured to provide the storage service to the users through the node 100B.

Regarding communications between the node 100A and its peer node such as the node 100B, the NTB module such as the NTB communications circuit 140A can be configured to communicate with a corresponding NTB module such as the NTB communications circuit 140B through a NTB path (labeled "NTB" for brevity) between the nodes 100A and 100B, to synchronize data and storage statuses of the nodes 100A and 100B and make them identical. Similarly, regarding communications between the node 100B and its peer node such as the node 100A, the NTB module such as the NTB communications circuit 140B can be configured to communicate with a corresponding NTB module such as the NTB communications circuit 140A through the NTB path between the nodes 100A and 100B, to synchronize data and storage statuses of the nodes 100A and 100B and make them identical. More particularly, the NTB modules such as the NTB communications circuit 140A and 140B can provide a function of a transport bridge between the nodes 100A and 100B and separate respective addresses domains of the nodes 100A and 100B, for facilitating communications between the nodes 100A and 100B without any address confliction. For example, the respective buses of the nodes 100A and 100B may conform to Peripheral Component Interconnect Express (PCIe) specification, and the NTB module of each node of the nodes 100A and 100B may be regarded as an endpoint of the node, where the nodes 100A and 100B may communicate and share devices with each other through the transport bridge, but the present invention is not limited thereto. According to some embodiments, the NTB modules such as the NTB communications circuit 140A and 140B can be implemented by way of a customized network interface circuit, for controlling the nodes 100A and 100B to communicate with each other as if they are communicating through network interface circuits.

Under control of the processor 110A running program modules 112A and the processor 110B running program modules 112B, the nodes 100A and 100B can maintain and monitor heartbeats over the NTB to determine peer node availability, for performing high availability (HA) control. For example, the node 100B can be configured to send a heartbeat signal to the node 100A, and the node 100A can be configured to detect and monitor the heartbeat signal from the node 100B to determine the availability of the node 100B, where whether the heartbeat signal from the node 100B exists may indicate whether the node 100B is available (or healthy). For another example, the node 100A can be configured to send a heartbeat signal to the node 100B, and the node 100B can be configured to detect and monitor the heartbeat signal from the node 100A to determine the availability of the node 100A, where whether the heartbeat signal from the node 100A exists may indicate whether the node 100A is available (or healthy). Based on the architecture shown in FIG. 1, when one of the nodes 100A and 100B is unavailable, the other of the nodes 100A and 100B can continue provide the storage service of the AFA server 100 for the users.

Please note that the AFA server 100 is equipped with more than one inter-node communications path. In addition to the NTB path, the AFA server 100 can be configured to have one or more additional communications paths such as a BMC path between the BMCs 150A and 150B, where the BMC 150A can be configured to manage at least one portion (e.g. a portion or all) of the hardware layer of the node 100A, and the BMC 150B can be configured to manage at least one portion (e.g. a portion or all) of the hardware layer of the node 100B. Regarding communications between the node 100A and its peer node such as the node 100B, the BMC 150A can be configured to communicate with the BMC 150B through the BMC path to access (e.g. read or write) one or more register values of one or more registers in the register circuit 152B, for performing status check, etc. on the node 100B. Similarly, regarding communications between the node 100B and its peer node such as the node 100A, the BMC 150B can be configured to communicate with the BMC 150A through the BMC path to access (e.g. read or write) one or more register values of one or more registers in the register circuit 152A, for performing status check, etc. on the node 100A. More particularly, the BMCs 150A and 150B can manage the respective hardware layer of the nodes 100A and 100B independently, having no need to rely on the processors 110A and 110B. For example, the BMC 150A can take care of unfinished works of the node 100A when the processor 110A malfunctions, and the BMC 150B can take care of unfinished works of the node 100B when the processor 110B malfunctions, but the present invention is not limited thereto. According to some embodiments, the BMCs 150A and 150B can be configured to take over the nodes 100A and 100B, respectively, to perform emergency processing to reduce the probability of data loss.

According to this embodiment, the AFA server 100 can be configured to be powered by multiple types of power sources. Each node of the nodes 100A and 100B may comprise at least one main power source (e.g. at least one power supply), for providing power to other components of the node in a normal power condition of the main power source. For example, the main power source of the node 100A can provide power to the main circuit board of the node 100A, and the main power source of the node 100B can provide power to the main circuit board of the node 100B. When an abnormal power condition of one or more nodes (e.g. the node 100A and/or the node 100B) is detected, one or more associated backup power sources (e.g. the backup power unit 170A and/or the backup power unit 170B) in the AFA server 100 can be configured to provide backup power. For example, the backup power unit 170A can provide power to the main circuit board of the node 100A (e.g. the processor 110A, the DRAM 120A, the C2F SSD 122A, the NTB communications circuit 140A, the BMC 150A, the register circuit 152A, etc.) when power failure of the main power source of the node 100A occurs, and the backup power unit 170B can provide power to the main circuit board of the node 100B (e.g. the processor 110B, the DRAM 120B, the C2F SSD 122B, the NTB communications circuit 140B, the BMC 150B, the register circuit 152B, etc.) when power failure of the main power source of the node 100B occurs.

According to some embodiments, each node of the nodes 100A and 100B (e.g. each of the respective main circuit boards of the nodes 100A and 100B) may further comprise sensors/detectors configured to perform detection on at least the components of the node to generate detection results (e.g. status obtained from any of the sensors/detectors). For example, a power detection result of the detection results may represent the power status of the main power source of the node, and more particularly, may indicate whether the abnormal power condition of the node occurs, for triggering the node to activate the backup power source (e.g. the backup power unit 170A or the backup power unit 170B) to provide the backup power.

Figure 2:
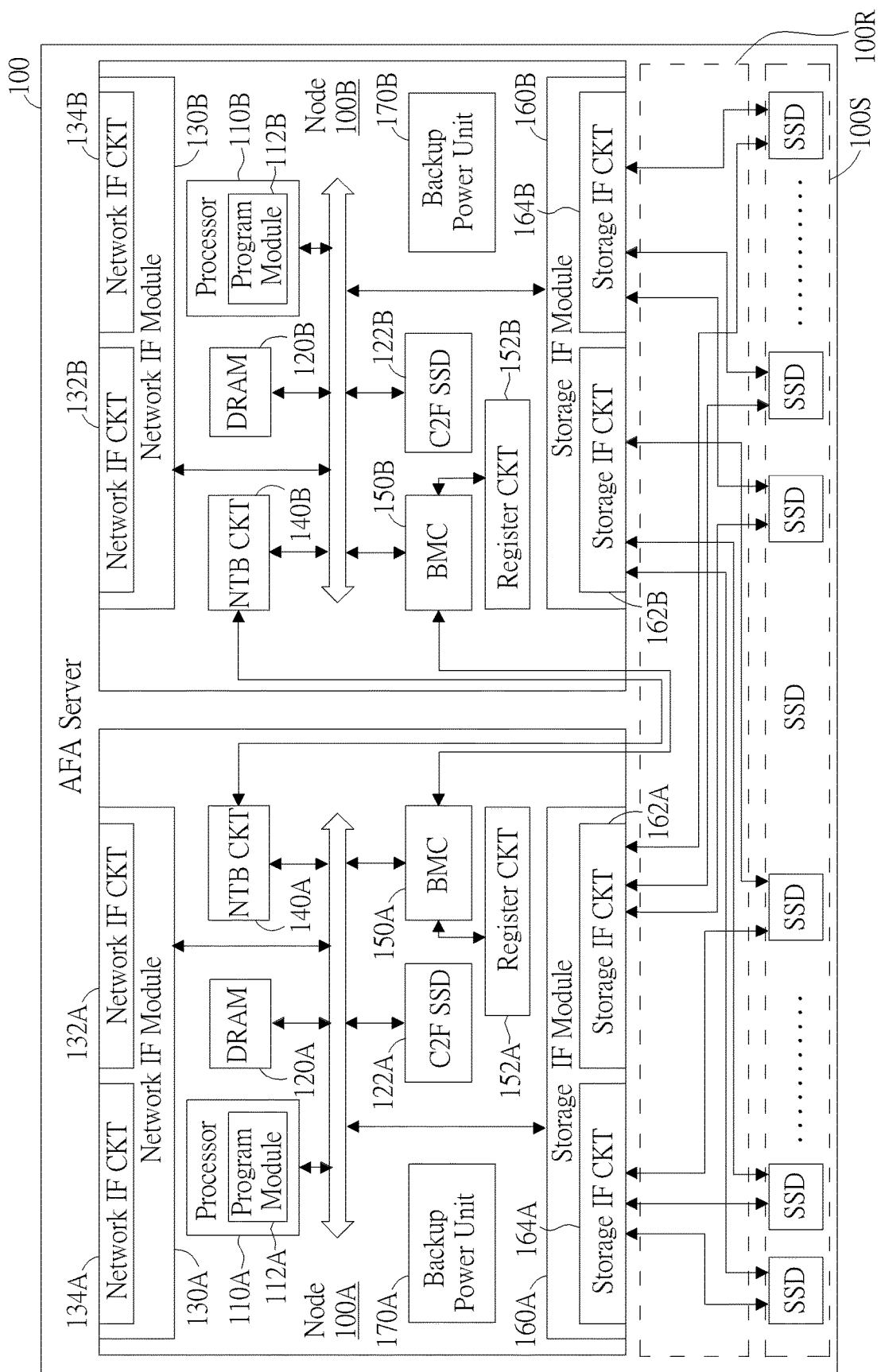
FIG. 2 illustrates some implementation details of the AFA server shown in FIG. 1 according to an embodiment of the present invention.

FIG. 2 illustrates some implementation details of the AFA server 100 shown in FIG. 1 according to an embodiment of the present invention, where the SSDs 100S can be taken as an example of the multiple SSDs mentioned in the embodiment shown in FIG. 1. In addition to the nodes 100A and 100B and the SSDs 100S, the AFA server 100 may further comprise a backplane circuit 100R. The backplane circuit 100R can be configured to electrically connect the SSDs 100S such as the SSD groups 12A and 12B to the nodes 100A and 100B. For example, the backplane circuit 100R can be implemented by way of a backplane circuit board having associated connectors, etc. In addition, a partial path of the NTB path between the NTB communications circuits 140A and 140B and a partial path of the BMC path between the BMCs 150A and 150B can be implemented within the backplane circuit 100R. As each of the NTB path and the BMC path does not pass through any cable which may be easily damaged, the communications paths between the nodes 100A and 100B are robust, and therefore, the nodes 100A and 100B can maintain effective communications and associated control to guarantee overall performance of the AFA server 100.

According to some embodiments, each of the SSDs 100S can be a single port SSD, and more particularly, can be a single port device based SSD. In addition, with aid of the backplane circuit 100R, the AFA server 100 can support hot-plug of any of the SSDs 100S.

According to some embodiments, one of the two nodes 100A and 100B may play a role of an active node in a high availability (HA) architecture of the AFA server 100, and another of the two nodes 100A and 100B may play a role of a standby node in the HA architecture of the AFA server 100. The two nodes 100A and 100B such as the active node and the standby node may interact with each other, and more particularly, may exchange node information through at least two communications paths such as the NTB path between the NTB communications circuits 140A and 140B and the BMC path between the BMCs 150A and 150B, and may synchronize data through the NTB path, but the present invention is not limited thereto. According to some embodiments, the AFA server 100 can be equipped with more than two inter-node communications paths.

Figure 3:
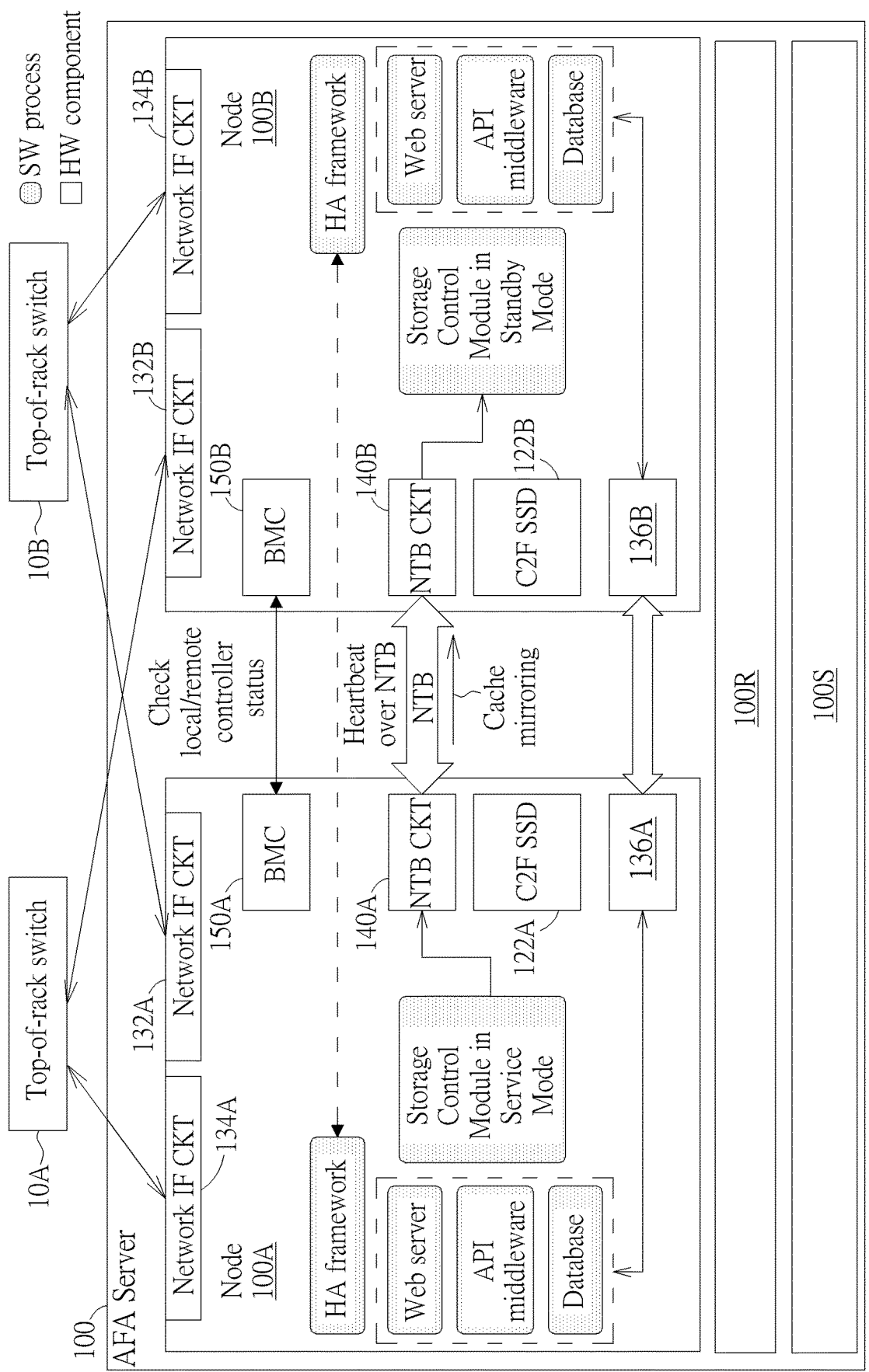
FIG. 3 illustrates a dual node architecture of the AFA server shown in FIG. 1 according to an embodiment of the present invention.

FIG. 3 illustrates a dual node architecture of the AFA server 100 shown in FIG. 1 according to an embodiment of the present invention. According to this embodiment, the nodes 100A and 100B can be configured to play the role of the active node and the role of the standby node, respectively, but the present invention is not limited thereto. For example, the nodes 100A and 100B can exchange their roles when there is a need. As shown in FIG. 3, in addition to some hardware (HW) components such as a portion of the components in the architecture shown in FIG. 1 or FIG. 2, some software (SW) processes such as HA framework processes, Web server processes, Database processes, a Storage Control Module process operating in a Service Mode and a Storage Control Module process operating in a Standby Mode (respectively labeled "HA framework", "Web server", "Database", "Storage Control Module in Service Mode" and "Storage Control Module in Standby Mode" for brevity) may be illustrated to indicate the associated interactions in the AFA server 100. The names of the processes described above indicate the associated functions thereof, respectively.

The software processes running on the node 100A (e.g. the HA framework process, the Web server process, the Database process, and the Storage Control Module process operating in the Service Mode) can be taken as examples of the program modules 112A, and the software processes running on the node 100B (e.g. the HA framework process, the Web server process, the Database process, and the Storage Control Module process operating in the Standby Mode) can be taken as examples of the program modules 112B, but the present invention is not limited thereto. In addition, the one or more network interface circuits of the network interface module 130A may further comprise a network interface circuit 136A, and the one or more network interface circuits of the network interface module 130B may further comprise a network interface circuit 136B. Thus, the AFA server 100 can be equipped with at least three inter-node communications paths such as the NTB path, the BMC path, and the network path between the network interface circuits 136A and 136B. For example, the nodes 100A and 100B can be configured to perform cache mirroring through the NTB path, check local/remote controller statuses through the BMC path, and perform additional communications operations through the network path between the network interface circuits 136A and 136B.

Figure 4:
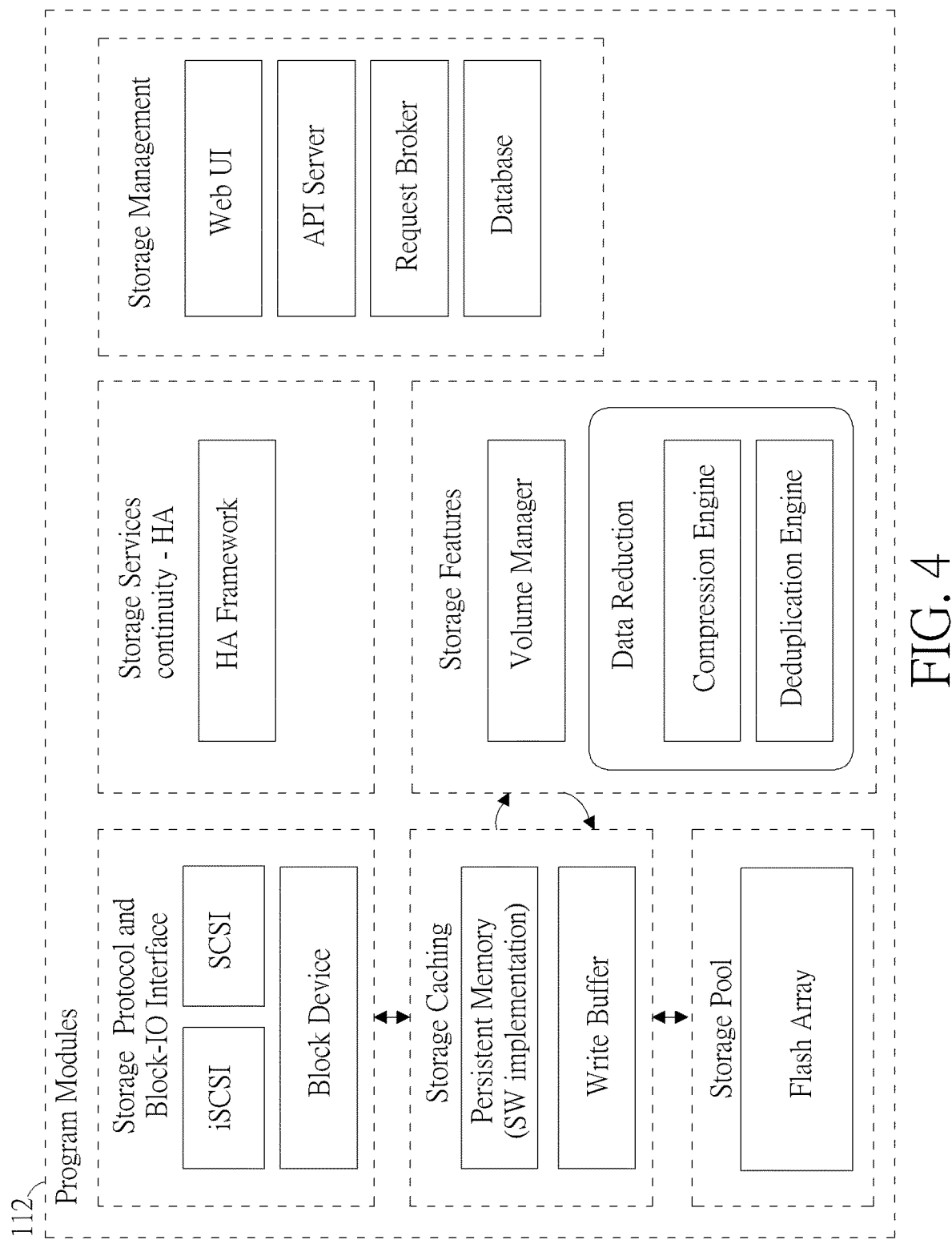
FIG. 4 illustrates some program modules in any of the nodes shown in FIG. 1 according to an embodiment of the present invention.

FIG. 4 illustrates some program modules 112 in any (e.g. each) of the nodes 100A and 100B shown in FIG. 1 according to an embodiment of the present invention. For example, the program modules 112 may represent the program modules 112A running on the processor 110A of the node 100A or the program modules 112B running on the processor 110B of the node 100B. As shown in FIG. 4, the program modules 112 may comprise some primary program modules such as a Storage Protocol and Block-Input/Output (IO) Interface module, a Storage Caching module, a Storage Pool module, a Storage Services continuity—HA module, a Storage Features module and a Storage Management module (respectively labeled "Storage Protocol and Block-IO Interface", "Storage Caching", "Storage Pool", "Storage Services continuity—HA", "Storage Features" and "Storage Management" for brevity), where any of the primary program modules may comprise one or more sub-modules. In addition, the arrows between some of the program modules 112 indicate that they can interact with each other among multiple layers of program modules. For example, the Storage Protocol and Block-IO Interface module can be regarded as an upper layer (e.g. an upper layer program module) above the Storage Caching module, the Storage Pool module can be regarded as a lower layer (e.g. a lower layer program module) below the Storage Caching module, and the Storage Features module and the Storage Caching module can be arranged in an intermediate layer to be intermediate layer program modules, where the Storage Protocol and Block-IO Interface module and the Storage Pool module can be configured to interact with the client device and the SSD group, but the present invention is not limited thereto. When there is a need, the node can trigger other program modules to interact with one or more of these program modules.

The Storage Protocol and Block-IO Interface module may comprise some sub-modules such as a Small Computer System Interface (SCSI) module, an Internet SCSI (iSCSI) module and a Block Device module (respectively labeled "SCSI", "iSCSI" and "Block Device" for brevity). The Storage Caching module may comprise some sub-modules such as a Persistent Memory using SW implementation module and a Write Buffer module (respectively labeled "Persistent Memory (SW implementation)" and "Write Buffer" for brevity). The Storage Pool module may comprise a sub-module such as a Flash Array module (labeled "Flash Array" for brevity). The Storage Services continuity—HA module may comprise a sub-module such as a HA Framework module (labeled "HA Framework" for brevity). The Storage Features module may comprise some sub-modules such as a Volume Manager module and a Data Reduction module (respectively labeled "Volume Manager" and "Data Reduction" for brevity), where the Data Reduction module may comprise some sub-modules such as a Compression Engine module and a Deduplication Engine module, which may be respectively referred to as the Compression Engine and the Deduplication Engine. The Storage Management module may comprise some sub-modules such as a Web User Interface (UI) module, an Application Programming Interface (API) Server module, a Request Broker module and a Database module (respectively labeled "Web UI", "API Server", "Request Broker" and "Database" for brevity). The names of the modules described above indicate the associated functions thereof, respectively.

According to some embodiments, the AFA server 100 (e.g. the active node, such as one of the nodes 100A and 100B) can be configured to receive requests such as a write request, a read request, etc. from a client device outside the AFA server 100, and operate in response to the requests, respectively.

Figure 5:
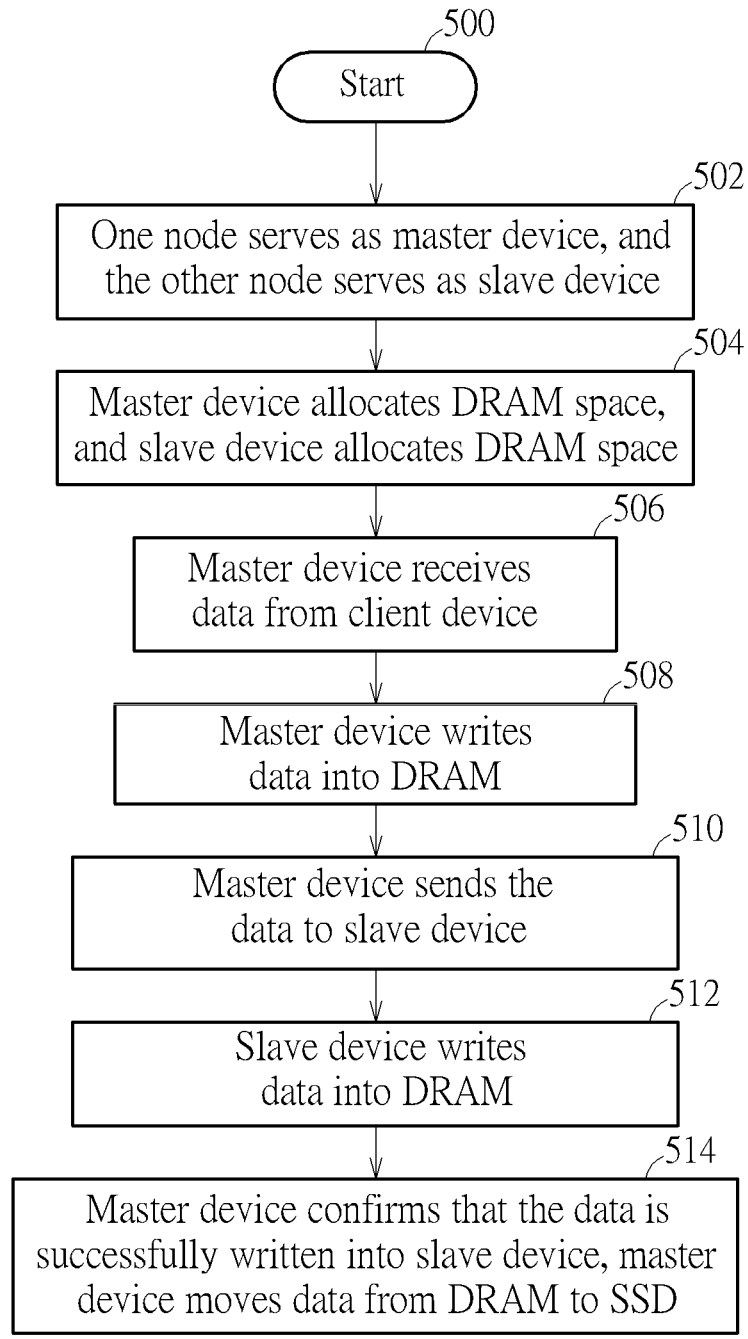
FIG. 5 is a diagram illustrating a write control scheme of the AFA server according to one embodiment of the present invention.

FIG. 5 is a diagram illustrating a write control scheme of the AFA server 100 according to one embodiment of the present invention. In Step 500, the AFA server 100 is powered on, and the AFA server 100 is able to communicate with client devices via at least one network (e.g. LAN, WAN, Internet, etc.) and the TOR switches 10A and 10B. In Step 502, one node of the AFA server 100 serves as a master device while the other node serves as a slave device. In this embodiment, the node 100A serves as the master device that is capable of communicating with the other electronic devices via the TOR switches 10A and 10B and accessing the SSDs 100S, and the node 100B serves as the slave device that is not allowed to access the SSDs 100S when the node 100A works normally. In Step 504, the processor 110A allocates a DRAM space within the DRAM 120A for use of a write buffer, and the processor 110A further notifies the processor 110B of the node 100B to allocate a DRAM space within the DRAM 120B for use of a write buffer, wherein the write buffer within the DRAM 120A/120B may have any suitable size. In Step 506, the node 100A receives data from a client device via the TOR switches 10A/10B, that is the client device writes the data into the AFA server 100 via the network. In Step 508, the node 100A writes the data into the DRAM space within the DRAM 120A. In Step 510, the node 100A performs a cache mirroring mechanism to send the data to the node 100B via the NTB. In Step 512, the processor 110B of the node 100B writes the data into the DRAM space within the DRAM 120B. In Step 514, the node 100A confirms that the data is successfully written into the DRAM space within the DRAM 120B, then the node 100A sends a message to the client device via the TOR switches 10A/10B to inform that the data is successfully received, then the processor 110A starts to move the data stored in the DRAM 120A into the SSDs 100S.

In addition, when the data stored in the DRAM 120A is moved to the SSDs 100S successfully, the processor 110A deletes the data in the DRAM 120A, the processor 110A further informs the node 100B that the data is stored in the SSDs 100S, so that the processor 110B can delete the data in the DRAM 120B.

The cache mirroring mechanism of the above embodiment shown in FIG. 5 is used for a failover mechanism to protect the data that has been written to the DRAM 120A but not yet written to SSDs 100S. That is, once the master device stores the received data in the DRAM 120A, the master device immediately sends the data to the slave device so that both the master device and the slave device have the data. Therefore, since both the master device and the slave device have the data, once the master device fails to properly work, the slave device can immediately replace the master device to perform the operation that was supposed to be performed by the master device, that is the slave device moves the data stored in the DRAM 120B to the SSDs 100S in an appropriate time.

In detail, if the master device (e.g. the node 100A) suddenly fails to access the SSDs 100S, for example, the operating system of the master device crashes, memory or a storage within the master device is broken, a downstream port is disabled, or any other failure causes, the AFA server 100 can immediately execute the failover mechanism, that is the slave device (e.g. the node 100B) is configured to perform the operations of the master device. Specifically, the master device and the slave device always communicate with each other, the slave device can detect if the master device is able to access the SSDs 100S, for example, if the slave device receives a special signal indicating a failover command from the master device, and/or the slave device does not receive a signal that is periodically sent from the master device, and/or the slave device sends a signal to the master device but does not receive a response, or any other failure detection mechanism, the slave device can determine that the master device fails to access the SSDs 100S.

Regarding the cache mirroring mechanism described in Steps 510-514, the present invention further provides a method for efficiently executing the cache mirroring mechanism, and this novel method has a faster data transmission while reducing the handshake burden of the two nodes 100A and 100B.

Figure 6:
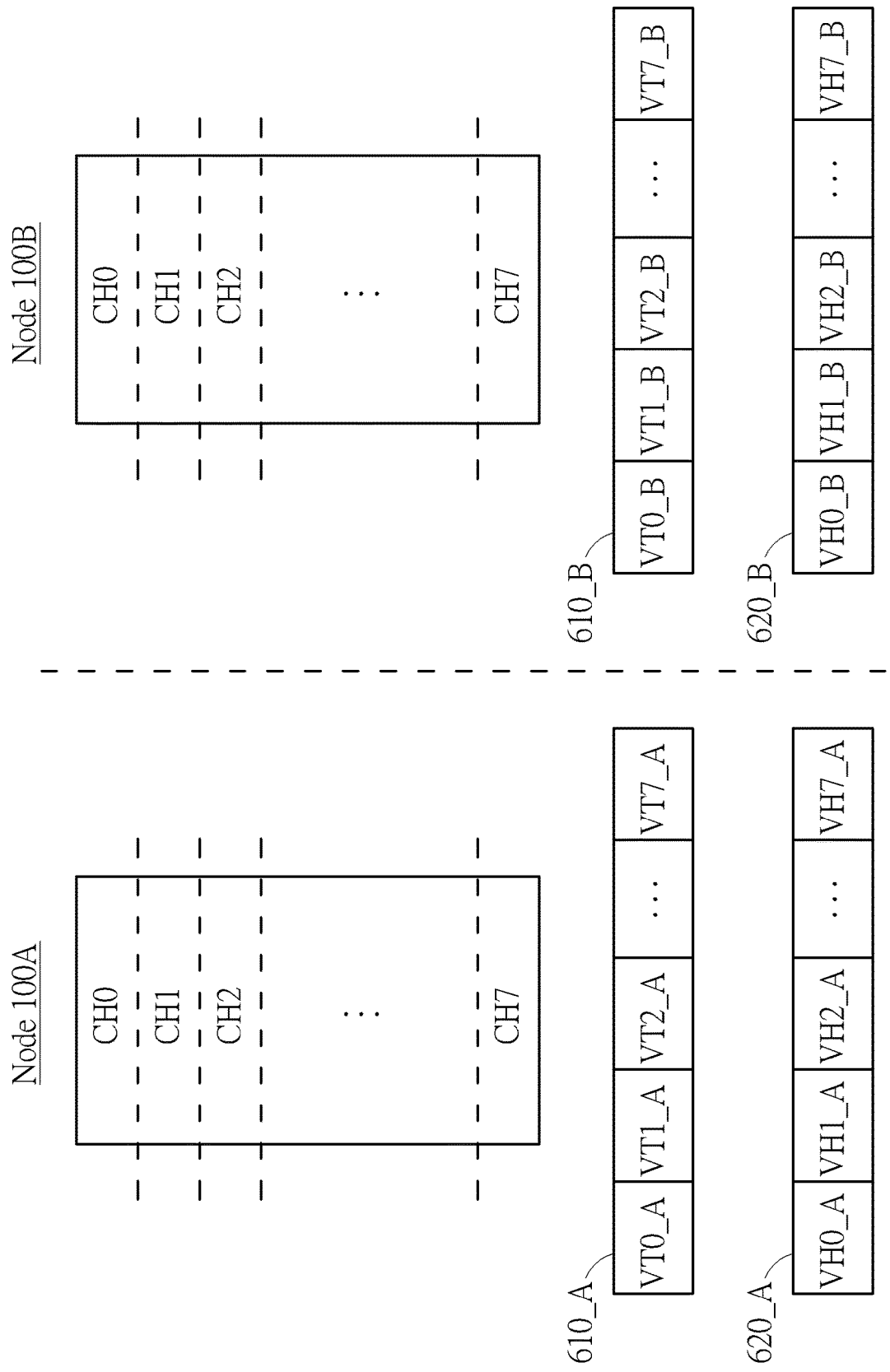
FIG. 6 shows a memory design for the cache mirroring mechanism according to one embodiment of the present invention.

FIG. 6 shows a memory design for the cache mirroring mechanism according to one embodiment of the present invention. As shown in FIG. 9, the write buffer within the DRAM 120A of the node 100A is divided into a plurality of channels (FIG. 6 shows eight channels CH0-CH7 as an example), and the write buffer within the DRAM 120B of the node 100B is also divided into a plurality channels CH0-CH7. The channels CH0-CH7 of the node 100A correspond to the channels CH0-CH7 of the node 100B, respectively, and the channels CH0-CH7 of the node 100B are used to store the data that was stored in the channels CH0-CH7 of the node 100A, respectively, that is the channel CH0 of the node 100B is used for the cache mirroring of the channel CH0 of the node 100A, the channel CH1 of the node 100B is used for the cache mirroring of the channel CH1 of the node 100A, and so on. In addition, the processor 110A of the node 100A further assigns tail registers 610_A to store the data writing information within the channels CH0-CH7 of the DRAM 120A. In one embodiment, there are eight tail registers shown in FIG. 6, and each of values $VT0\_A$-$VT7\_A$ of the eight tail registers will increase by one if the processor 110A writes data whose data amount is equal to a write unit into the channels CH0-CH7, respectively, wherein the write unit may be four kilobytes. In other words, each of the values of the eight tail registers is the amount of data that the processor 110A has been, is and is about to send to the node 100B, wherein the amount of data can be represented by s number of the write units. For example, if the value $VT0\_A$ is '3' and the processor 100A further writes sixteen kilobytes data (i.e., four write units) into the channel CH0, the value $VT0\_A$ will become '7'. Furthermore, the processor 110B of the node 100B further assigns tail registers 610_B, wherein the tail registers 610_B are synchronized by the tail registers 610_A, that is the values $VT0\_B$-$VT7\_B$ of the tail registers 610_B are updated by using the values $VT0\_A$-$VT7\_A$ of the tail registers 610_A, respectively.

In addition, the processor 110B of the node 100B further assigns head registers 620_B to store the data writing information within the channels CH0-CH7 of the DRAM 120B. In one embodiment, there are eight head registers shown in FIG. 6, and each of values $VH0\_B$-$VH7\_B$ of the eight head registers will increase by one if the processor 110B writes data whose data amount is equal to the write unit (e.g. four kilobytes) into the channels CH0-CH7 of the DRAM 120B, respectively. In other words, each of the values of the eight head registers is the amount of data that has been stored in the corresponding channel, wherein the amount of data can be represented by a number of write units. For example, if the value VH1_B is '2' and the eight kilobytes data (i.e. two write units) from the node 100A are written into the channel CH1, the value VH1_B will become '4'. Furthermore, the processor 110A of the node 100A further assigns head registers 620_A, wherein the head registers 620_A are synchronized by the head registers 620_B, that is the values VH0_A-VH7_A of the head registers 610_A are updated by using the values VH0_B-VH7_B of the head registers 610_B, respectively.

Figure 7:
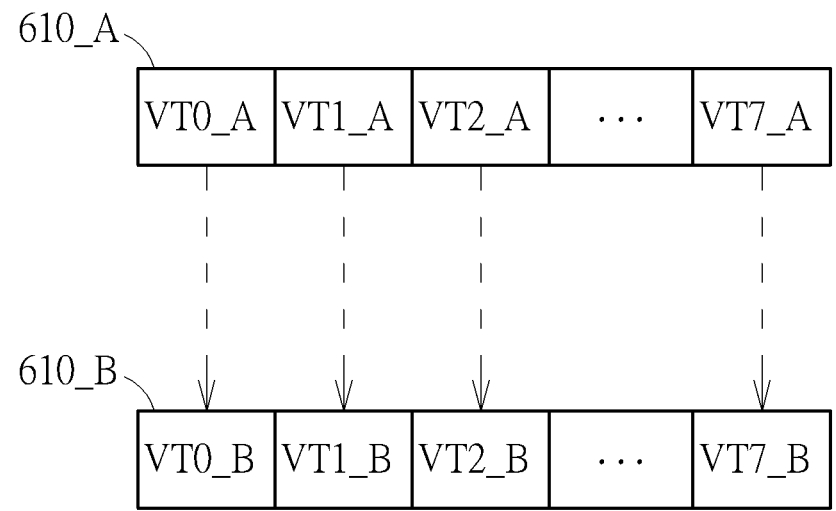
FIG. 7 shows the synchronization of the tail registers and the head registers according to one embodiment of the present invention.
Figure 7:
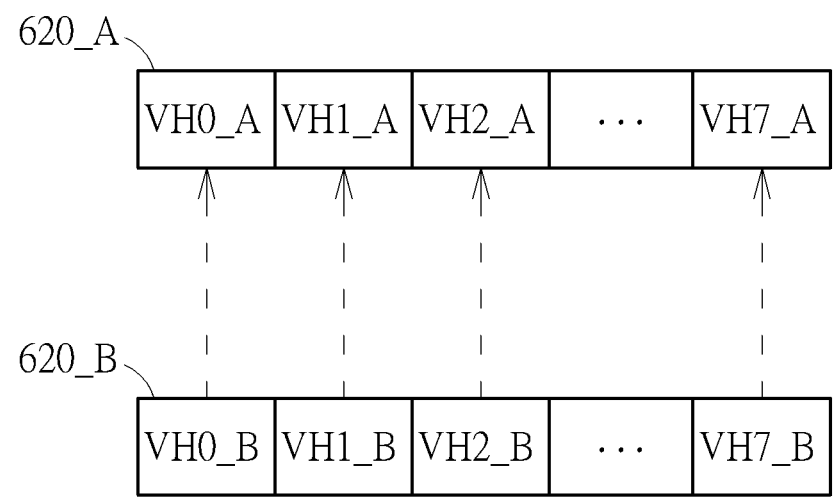

FIG. 7 shows the synchronization of the tail registers 610_B and the head registers 620_A according to one embodiment of the present invention. As shown in FIG. 7, the values VT0_B-VT7_B of the tail registers 610_B are updated by using the values VT0_A-VT7_A of the tail registers 610_A, respectively, and the values VH0_A-VH7_A of the head registers 610_A are updated by using the values VH0_B-VH7_B of the head registers 610_B, respectively.

In the above embodiment shown in FIG. 6 and FIG. 7, the slave device (i.e. the node 100B) can easily know how much data will be sent from the master device (i.e. the node 100A) by checking the tail registers 610_B and the head registers 620_B. For example, if the value VT0_B of the tail registers 610_B is '6' and the value VH0_B of the head registers 620_B is '4', it means that data having two write units will be sent from the master device, and the slave device can schedule internal works in advance to improve the efficiency. In addition, the master device can easily know how much data has been successfully written into the node 100_B by checking the tail registers 610_A and the head registers 620_A. For example, if the value VT1_A of the tail registers 610_A is '7' and the value VH1_A of the head registers 620_A is changed from '6' to '7', it means that the latest data within the channel CH1 of the write buffer of the DRAM 120A has been copied to the slave device, then the processor 110A can confirm that the latest data is successfully written into the slave device, and the processor 110A sends a notification to the client device to notify that the data from the client device is successfully received, and the processor 110A starts to move the data stored in the DRAM 120A into the SSDs 100S.

In light of above, the master device and slave device can efficiently perform the cache mirroring operation by checking the tail registers and the head registers, and the master device and the slave device do not need to send any other message/notification related to the cache mirroring operation. Therefore, the handshake burden of the master device and the salve device can be reduced.

In addition, because the node 100A may receive data from many client devices, by dividing the write buffer of the node 100A/100B into many channels, the data for the client devices can be sent from the node 100A to the node 100B in parallel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A server, comprising:
a solid state drive (SSD);
a first node, comprising:
a first memory, comprising a first write buffer, at least a first tail register and at least a first head register;
a first processor configured to control operations of the first node; and
a first communication circuit, coupled to the first processor and the first memory; and
a second node, comprising:
a second memory, comprising a second write buffer, at least a second tail register and at least a second head register;
a second processor configured to control operations of the second node; and
a second communication circuit, coupled to the second processor, the second memory and the first communication circuit;
wherein the first tail register records data writing information of the first write buffer, the second tail register is synchronized by the first tail register, the second head register records data writing information of the second write buffer, and the first head register is synchronized by the second head register;
wherein when the first processor of the first node receives data from another electronic device, the first processor sends the data to the second node to store the data into the first write buffer, and the first processor further sends the data to the second node; and the first processor refers to the first tail register and the first head register to determine if the data is successful written into the second node.

2. The server of claim 1, wherein the first tail register records a first value indicating a number of write units that has been stored in the first write buffer, the second head register records a second value indicating a number of write units that has been stored in the second write buffer, and the first head register is synchronized by the second head register to record the second value; and if a difference between the first value and the second value is 'N', the first processor refers to the first tail register and the first head register to determine that the latest 'N' write unit(s) stored in the first write buffer are not successfully written into the second write buffer, wherein 'N' is a positive integer; and if the difference between the first value and the second value is zero, the first processor determines that all the data stored in the first write buffer are successfully written into the second write buffer.

3. The server of claim 1, wherein the first processor determines if the data is successful written into the second node by only referring to the first tail register and the first head register, without referring to any other confirmation signal from the second node.

4. The server of claim 1, wherein the second processor refers to the second tail register and the second head register to determine if the second write buffer will receive data from the first node.

5. The server of claim 4, wherein the first tail register records a first value indicating a number of write units that has been stored in the first write buffer, the second tail register is synchronized by the first tail register to record the first value, and the second head register records a second value indicating a number of write units that has been stored in the second write buffer; and if a difference between the first value and the second value is 'M', the second processor refers to the second tail register and the second head register to determine that the first node will send 'M' write unit(s) to the second node, wherein 'M' is a positive integer; and if the difference between the first value and the second value is zero, the second processor determines that the second write buffer has stored all the data that is stored in the first write buffer.

6. The server of claim 1, wherein the first write buffer is divided into a plurality of first channels, the first memory comprises a plurality of first tail registers and a plurality of first head registers, and each first channel corresponds to one first tail register and one first head register; the second write buffer is divided into a plurality of second channels, the second memory comprises a plurality of second tail registers and a plurality of second head registers, and each second channel corresponds to one second tail register and one second head register; a number of first channels of the first write buffer is the same as a number of the second channels of the second write buffer; and each of the first tail registers records data writing information of the corresponding first channel of the first write buffer, the second tail register is synchronized by the corresponding first tail register, each of the second head registers records data writing information of the corresponding second channel of the second write buffer, and the first head register is synchronized by the corresponding second head register.

7. The server of claim 6, wherein for each of the first channels and the corresponding second channel: the first tail register records a first value indicating a number of write units that has been stored in the first channel, the second head register records a second value indicating a number of write units that has been stored in the second channel, and the first head register is synchronized by the second head register to record the second value; and if a difference between the first value and the second value is 'N', the first processor refers to the first tail register and the first head register to determine that the latest 'N' write unit(s) stored in the first channel are not successfully written into the second channel, wherein 'N' is a positive integer; and if the difference between the first value and the second value is zero, the first processor determines that all the data stored in the first channel are successfully written into the second channel.

8. A control method of a server, comprising:
   setting a first node within the server as a master device;
   setting a second node within the server as a slave device;
   controlling the first node to receive data from another device via network;
   storing the data into a first write buffer within the first node;
   performing a cache mirroring operation to copy the data stored in the first write buffer into a second write buffer within the second node;
   setting a first tail register and a first head register within the first node, and setting a second tail register and a second head register within the second node, wherein the first tail register records data writing information of the first write buffer, the second tail register is synchronized by the first tail register, the second head register records data writing information of the second write buffer, and the first head register is synchronized by the second head register; and
   referring to the first tail register and the first head register, by using a first processor within the first node, to determine if the data stored in the first write buffer is successful written into the second write buffer.

9. The control method of claim 8, wherein the first tail register records a first value indicating a number of write units that has been stored in the first write buffer, the second head register records a second value indicating a number of write units that has been stored in the second write buffer, and the first head register is synchronized by the second head register to record the second value; and the step of referring to the first tail register and the first head register, by using the first processor within the first node, to determine if the data stored in the first write buffer is successful written into the second write buffer comprises:
   if a difference between the first value and the second value is 'N', the first processor refers to the first tail register and the first head register to determine that the latest 'N' write unit(s) stored in the first write buffer are not successfully written into the second write buffer, wherein 'N' is a positive integer; and
   if the difference between the first value and the second value is zero, the first processor determines that all the data stored in the first write buffer are successfully written into the second write buffer.

10. The control method of claim 8, further comprising:
    referring to the second tail register and the second head register, by using a second processor within the second node, to determine if the second write buffer will receive data from the first node.

11. The control method of claim 10, wherein the first tail register records a first value indicating a number of write units that has been stored in the first write buffer, the second tail register is synchronized by the first tail register to record the first value, and the second head register records a second value indicating a number of write units that has been stored in the second write buffer; and the step of referring to the second tail register and the second head register, by using the second processor within the second node, to determine if the second write buffer will receive data from the first node comprises:
    if a difference between the first value and the second value is 'M', the second processor refers to the second tail register and the second head register to determine that the first node will send 'M' write unit(s) to the second node, wherein 'M' is a positive integer; and
    if the difference between the first value and the second value is zero, the second processor determines that the second write buffer has stored all the data that is stored in the first write buffer.

12. The control method of claim 8, wherein the first write buffer is divided into a plurality of first channels, a plurality of first tail registers and a plurality of first head registers are allocated, and each first channel corresponds to one first tail register and one first head register; the second write buffer is divided into a plurality of second channels, a plurality of second tail registers and a plurality of second head registers are allocated, and each second channel corresponds to one second tail register and one second head register; a number of first channels of the first write buffer is the same as a number of the second channels of the second write buffer; and each of the first tail registers records data writing information of the corresponding first channel of the first write buffer, the second tail register is synchronized by the corresponding first tail register, each of the second head registers records data writing information of the corresponding second channel of the second write buffer, and the first head register is synchronized by the corresponding second head register.

13. The control method of claim 12, wherein for each of the first channels and the corresponding second channel: the first tail register records a first value indicating a number of write units that has been stored in the first channel, the second head register records a second value indicating a number of write units that has been stored in the second channel, and the first head register is synchronized by the second head register to record the second value; and the step of referring to the first tail register and the first head register, by using the first processor within the first node, to determine if the data stored in the first write buffer is successful written into the second write buffer comprises:
- if a difference between the first value and the second value is 'N', the first processor refers to the first tail register and the first head register to determine that the latest 'N' write unit(s) stored in the first channel are not successfully written into the second channel, wherein 'N' is a positive integer; and
- if the difference between the first value and the second value is zero, the first processor determines that all the data stored in the first channel are successfully written into the second channel.

* * * * *